United States Patent
Kim (10) Patent No.: US 8,765,291 B2
(45) Date of Patent: Jul. 1, 2014

(54) RECHARGEABLE BATTERY

(75) Inventor: Hyoseob Kim, Suwon-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 476 days.

(21) Appl. No.: 12/610,103

(22) Filed: Oct. 30, 2009

(65) Prior Publication Data

US 2010/0297484 A1    Nov. 25, 2010

Related U.S. Application Data (60) Provisional application No. 61/180,076, filed on May 20, 2009.

(51) Int. Cl.
*H01M 2/00*    (2006.01)
*H01M 2/02*    (2006.01)

(52) U.S. Cl.
USPC ............................ 429/163; 429/170; 429/178

(58) Field of Classification Search
USPC ......................................... 429/163, 170, 178
See application file for complete search history.

(56) References Cited

U.S. PATENT DOCUMENTS

| | | | |
|---|---|---|---|
| 6,432,574 B1 | 8/2002 | Suzuki et al. | |
| 6,534,212 B1 | 3/2003 | Hooke | |
| 2001/0051296 A1* | 12/2001 | Morishita et al. | 429/94 |
| 2005/0287429 A1* | 12/2005 | Cho et al. | 429/161 |
| 2005/0287435 A1* | 12/2005 | Kim | 429/174 |
| 2006/0063068 A1 | 3/2006 | Cheon et al. | |

FOREIGN PATENT DOCUMENTS

| | | | | |
|---|---|---|---|---|
| CN | 1290972 A | | 4/2001 | |
| CN | 200979902 | | 11/2007 | |
| CN | 201146220 | | 11/2008 | |
| EP | 1 734 599 A2 | | 12/2006 | |
| EP | 2 124 285 A1 | | 11/2009 | |
| EP | 2 244 328 A2 | | 10/2010 | |
| JP | 56-112768 U | | 8/1981 | |
| JP | 02-004102 | | 1/1990 | |
| JP | 08-022818 | | 1/1996 | |
| JP | 08022818 A | * | 1/1996 | ............. H01M 2/26 |
| JP | 2000-260418 | | 9/2000 | |
| JP | 2002-075322 | | 3/2002 | |
| JP | 2003-533853 | | 11/2003 | |

(Continued)

OTHER PUBLICATIONS

English machine translation for JP publication No. JP 08-022818, 6 pps.
Korean Patent Abstract for KR publication No. KR 10-2003-0053599, 2 pps. and corresponding to KR 10-0402748, listed above.
European Communication dated Apr. 17, 2012, for corresponding European Patent application 10163241.2, 6 pages.

(Continued)

*Primary Examiner* — Karie O'Neill Apicella
(74) *Attorney, Agent, or Firm* — Christie, Parker & Hale, LLP (57) ABSTRACT

A rechargeable battery having increased output and capacity, and improved reliability and safety. A rechargeable battery includes: an electrode assembly including a first electrode plate including a plurality of first protrusions extending from an end of the electrode assembly and a second electrode plate including a plurality of second protrusions extending from the end of the electrode assembly, at least one of the plurality of first protrusions or the plurality of second protrusions including a planar portion and a curved portion; a case containing the electrode assembly; and a collector plate coupled to the at least one of the plurality of first protrusions or the plurality of second protrusions and covering at least the curved portion.

14 Claims, 8 Drawing Sheets

(56) References Cited

FOREIGN PATENT DOCUMENTS

| | | |
|---|---|---|
| JP | 2006-012836 | 1/2006 |
| JP | 2006-310267 | 11/2006 |
| JP | 2007-115584 | 5/2007 |
| JP | 2007-250442 | 9/2007 |
| JP | 2008-192315 | 8/2008 |
| JP | 2008-226625 | 9/2008 |
| KR | 10-2003-0053599 | 7/2003 |
| KR | 2003-0053599 | 7/2003 |
| KR | 10-0402748 | 10/2003 |
| KR | 10-2005-0123485 | 12/2005 |
| KR | 10-2005-0123485 A | 12/2005 |
| KR | 10-2006-0019768 | 3/2006 |
| KR | 10-2006-0102854 | 9/2006 |
| KR | 10-2006-0102854 A | 9/2006 |
| KR | 10-2006-0118955 | 11/2006 |
| KR | 10-2009-0008868 | 1/2009 |
| WO | WO 2008/126538 A1 | 10/2008 |

OTHER PUBLICATIONS

European Search Report dated Aug. 30, 2010, for priority U.S. Appl. No. 61/180,076, noting listed references in this IDS.

KIPO Notice of Allowance dated Mar. 30, 2012, for corresponding Korean Patent application 10-2009-0117754, (5 pages).

Chinese Office action issued in corresponding CN Application No. 201010167822.0 dated Jul. 12, 2012, 7 pgs. and English Machine Translation, 8 pgs.

Japanese Office action dated Oct. 2, 2012, for corresponding Japanese Patent application 2010-025594, (3 pages).

Patent Abstracts of Japan, and English machine translation for Japanese Publication 2000-260418 listed above, (8 pages).

Patent Abstracts of Japan, and English machine translation of Japanese Publication 2002-075322 dated Mar. 15, 2002, listed above, (12 pages).

Patent Abstracts of Japan, and English machine translation of Japanese Publication 2002-075322 dated Mar. 15, 2002, listed above, (16 pages).

\* cited by examiner

RECHARGEABLE BATTERY

CROSS-REFERENCE TO RELATED APPLICATION

This application claims priority to and the benefit of U.S. Provisional Patent Application No. 61/180,076 filed on May 20, 2009, the entire content of which is incorporated herein by reference.

BACKGROUND

1. Field

Aspects of embodiments of the present invention relate to a rechargeable battery.

2. Description of the Related Art

Rechargeable batteries can be repeatedly charged and discharged, unlike primary batteries that are incapable of being recharged. A low-capacity battery including one battery cell packaged in the form of a pack is used in a small-sized portable electronic device such as a cellular phone or a camcorder. A high-capacity battery including several tens of battery packs connected to each other is widely used as a power source for driving a motor in a vehicle such as a hybrid electric vehicle.

Rechargeable batteries are fabricated in various shapes, typically cylindrical and prismatic shapes. A rechargeable battery is usually fabricated by interposing a separator as an insulator between strip-shaped positive and negative electrode plates, winding the electrode laminate in a spiral to construct an electrode assembly (or a jelly roll), accommodating the electrode assembly in a case, and installing a cap assembly provided with electrode terminals on the case.

A common high-capacity rechargeable battery includes collector plates for collecting a great amount of current in a short time in aspects of capacity or output. The collector plates are electrically connected to a positive electrode non-coating portion of a positive electrode plate and a negative electrode non-coating portion of a negative electrode plate to induce electric currents generated in the positive and negative electrode plates to positive and negative terminals, respectively. The electrode non-coating portions are exposed at opposite ends of the electrode assembly.

SUMMARY

According to an aspect of embodiments of the present invention, a rechargeable battery includes a collector plate coupled to a round or curved portion of an electrode non-coating portion and an electrode terminal to reduce a length of a current path between the electrode terminal and the electrode assembly and reduce an internal resistance.

According to another aspect of embodiments of the present invention, a rechargeable battery includes an electrode assembly coupled to a collector plate without connection tabs to save space in a case of the rechargeable battery and provide for an increase in the number of turns of the electrode assembly, thereby increasing a capacity of the rechargeable battery.

According to another aspect of embodiments of the present invention, a rechargeable battery includes a collector plate coupled to an electrode assembly having a perpendicular winding axis by laser welding to facilitate a smooth flow of gas released from the electrode assembly to a safety vent positioned above the electrode assembly and provide for a region through which the gas released from the electrode assembly flows, thereby resulting in high reliability and safety of the rechargeable battery.

According to an exemplary embodiment, a rechargeable battery includes: an electrode assembly including a first electrode plate including a plurality of first protrusions extending from an end of the electrode assembly and a second electrode plate including a plurality of second protrusions extending from the end of the electrode assembly, at least one of the plurality of first protrusions or the plurality of second protrusions including a planar portion and a curved portion; a case containing the electrode assembly; and a collector plate coupled to the at least one of the plurality of first protrusions or the plurality of second protrusions and covering at least the curved portion.

In one embodiment, the planar portion extends in a length direction and the curved portion is at a side of the electrode assembly distal from a central axis of the electrode assembly, and the collector plate is welded to the curved portion. The planar portion may have a planar edge that is substantially perpendicular to the length direction at a side proximate the central axis. The planar portion may have a planar edge that is angled toward a central region of the electrode assembly in the length direction.

The collector plate may include a planar region at a location corresponding to the planar portion of the electrode assembly, and a curved region welded to the curved portion of the electrode assembly. The collector plate may be a first collector plate coupled to the plurality of first protrusions at a first side of the end of the electrode assembly, and the rechargeable battery may further include a second collector plate coupled to the plurality of second protrusions at a second side of the end of the electrode assembly opposite the first side.

In one embodiment, the collector plate includes a recessed portion and is welded to the electrode assembly at the recessed portion. The recessed portion of the collector plate may press and/or bend the at least one of the plurality of first protrusions or the plurality of second protrusions. The collector plate may further include a base portion including the recessed portion, and a flange portion surrounding the base portion. The recessed portion of the collector plate may include a plurality of recessed portions extending in the length direction and welded to the electrode assembly. The recessed portion of the collector plate may include a plurality of recessed portions extending in a direction substantially perpendicular to the length direction and welded to the electrode assembly. The collector plate may have at least one opening formed through the recessed portion. The at least one opening may include a plurality of slits.

In one embodiment, the end of the electrode assembly is not coated with an electrode active material. In one embodiment, a rechargeable battery includes a cap assembly including a cap plate sealing an opening of the case and a safety vent configured to release gas from the rechargeable battery. In one embodiment, the collector plate is laser welded to the at least one of the plurality of first protrusions or the plurality of second protrusions.

In one embodiment of a rechargeable battery of the present invention, collector plates are coupled to upwardly protruding round or curved portions of an electrode non-coating portion of an electrode assembly having a vertical winding axis. The collector plates are further coupled to corresponding electrode terminals, providing a short length of a current path between the electrode terminals and the electrode assembly and reduce an internal resistance of the rechargeable battery.

In addition, in one embodiment of a rechargeable battery of the present invention, the electrode assembly is directly coupled to the collector plates without the use of connection tabs allowing space savings in a case of the rechargeable battery, which may be utilized to increase a number of turns of the electrode assembly and correspondingly increase the capacity of the rechargeable battery.

Furthermore, in one embodiment of a rechargeable battery of the present invention, the collector plates are joined to an upper surface of the electrode assembly having a vertical winding axis by laser welding. The laser welded configuration allows gas to flow smoothly from the electrode assembly to a safety vent positioned above the electrode assembly while providing a region through which the gas released from the electrode assembly flows, resulting in high reliability and safety of the rechargeable battery.

BRIEF DESCRIPTION OF THE DRAWINGS

These and/or other features and aspects of the present invention will become apparent and more readily appreciated from the following description of some exemplary embodiments, taken in conjunction with the accompanying drawings of which.

DETAILED DESCRIPTION

Reference will now be made in further detail to some exemplary embodiments of the present invention, examples of which are illustrated in the accompanying drawings, wherein like reference numerals refer to the like elements throughout.

Figure 1:
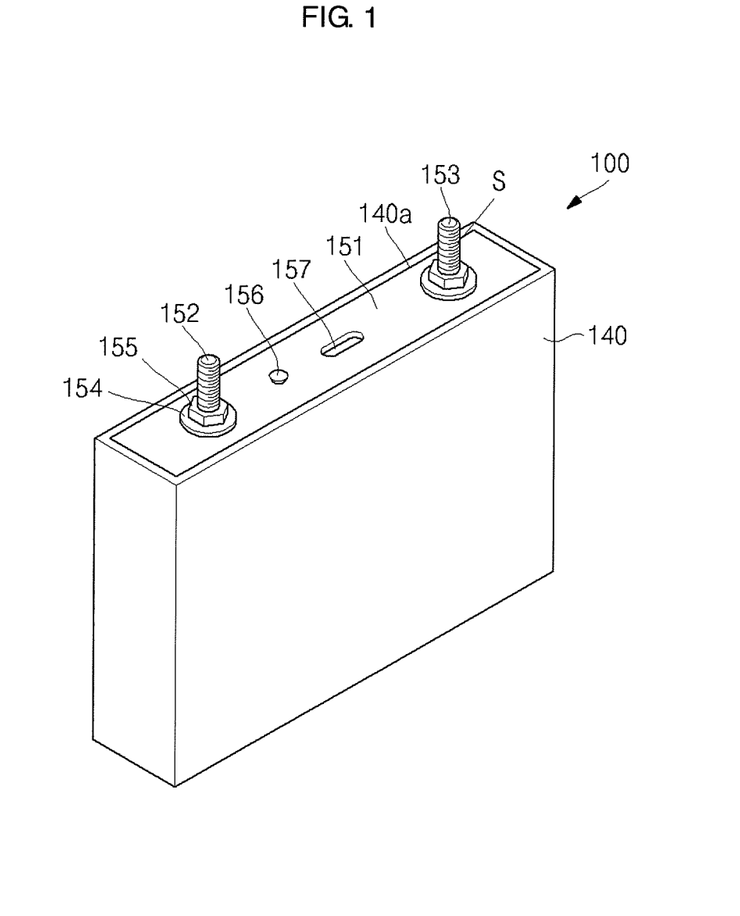
FIG. 1 is a perspective view illustrating a rechargeable battery according to an embodiment of the present invention.
Figure 2:
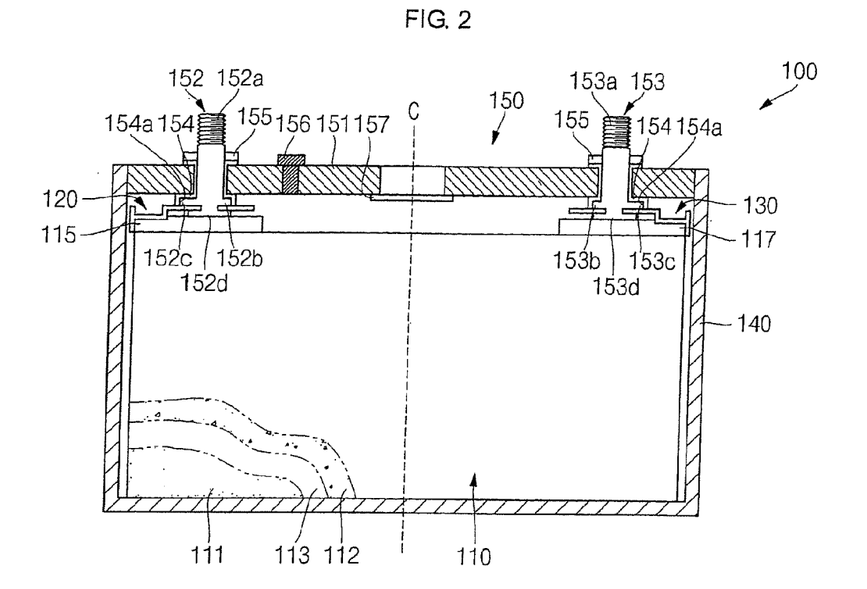
FIG. 2 is a cross-sectional view illustrating the rechargeable battery of FIG. 1.
Figure 3:
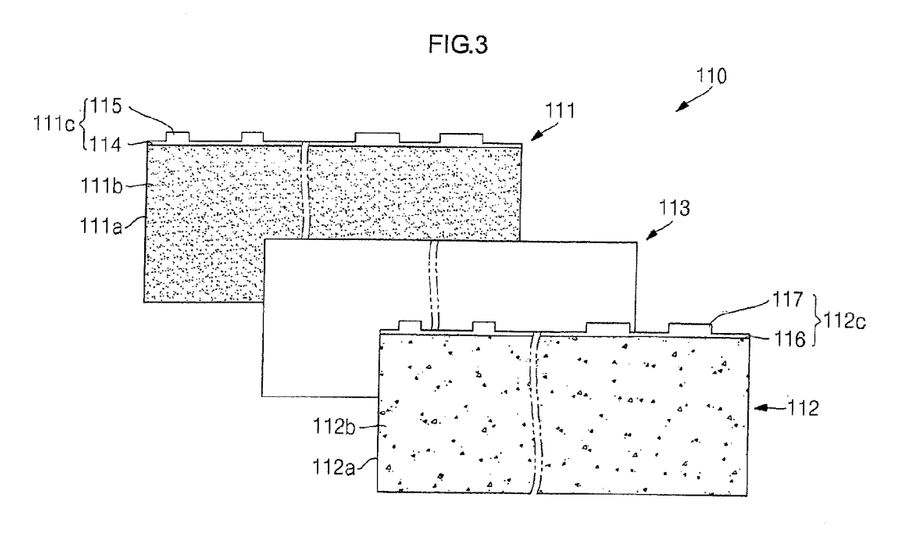
FIG. 3 is an exploded perspective view illustrating an electrode assembly of the rechargeable battery of FIG. 1 before winding.
Figure 4:
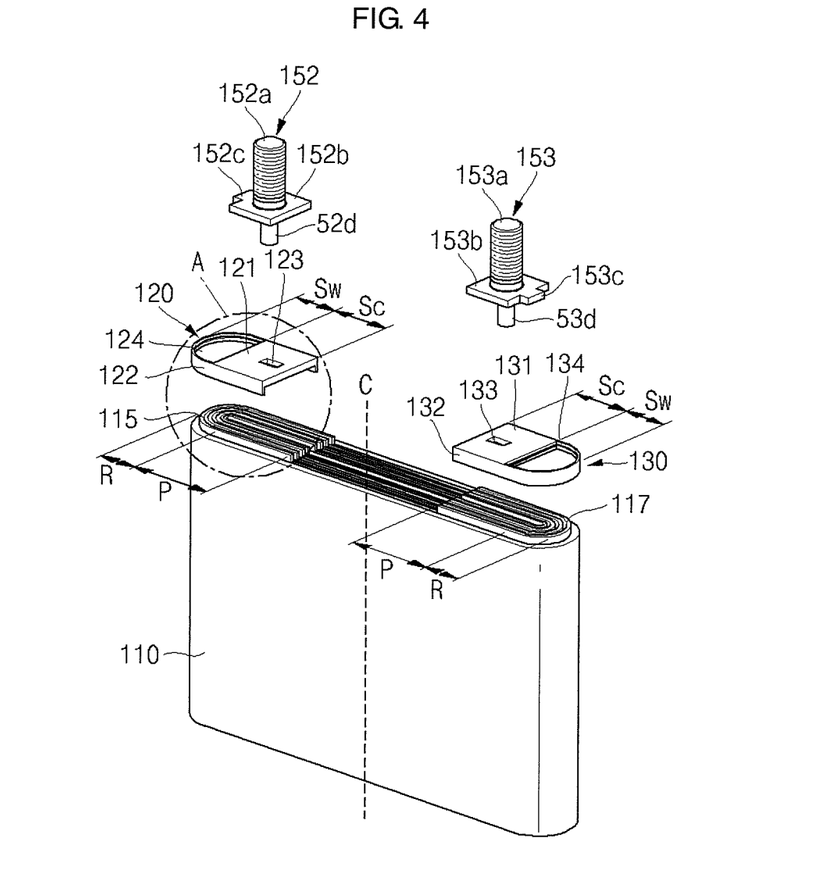
FIG. 4 is a partially exploded perspective view illustrating an electrode assembly, first and second collector plates, and first and second electrode terminals of the rechargeable battery of FIG. 1.
Figure 5:
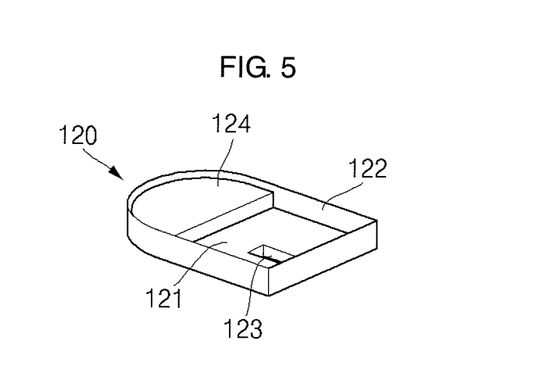
FIG. 5 is a perspective view illustrating the first collector plate of FIG. 4 in which a lower surface is shown facing upward.
Figure 6:
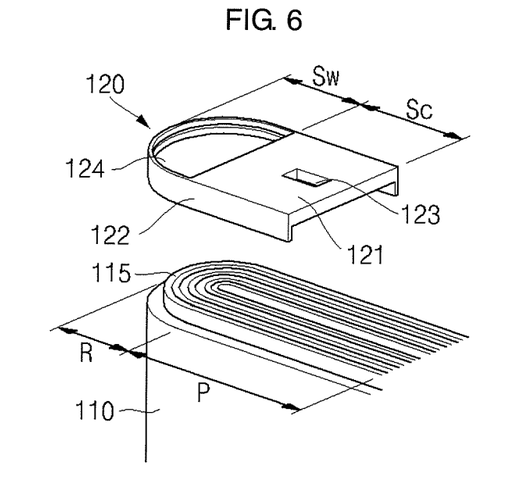
FIG. 6 is an enlarged perspective view illustrating region 'A' of FIG. 4.

FIG. 1 is a perspective view illustrating a rechargeable battery according to an embodiment of the present invention. FIG. 2 is a cross-sectional view illustrating the rechargeable battery of FIG. 1. FIG. 3 is an exploded perspective view illustrating an electrode assembly of the rechargeable battery of FIG. 1 before winding. FIG. 4 is a partially exploded perspective view illustrating an electrode assembly, first and second collector plates, and first and second electrode terminals of the rechargeable battery of FIG. 1. FIG. 5 is a perspective view illustrating the first collector plate of FIG. 4 in which a lower surface is shown facing upward. FIG. 6 is an enlarged perspective view illustrating region 'A' of FIG. 4.

Referring to FIGS. 1 through 3, a rechargeable battery 100 may be a prismatic rechargeable battery capable of high-capacity output. The rechargeable battery 100 includes: an electrode assembly 110; a first collector plate 120 and a second collector plate 130 disposed on and electrically connected to the electrode assembly 110; a case 140 accommodating the electrode assembly 110, the first collector plate 120, the second collector plate 130 and an electrolyte (not shown) therein; and a cap assembly 150 closing an open upper portion of the case 140.

The electrode assembly 110 is produced by winding or folding a laminate of a first electrode plate 111, a separator 113, and a second electrode plate 112, all of which are in the form of a thin plate or film. The first electrode plate 111 and the second electrode plate 112 may function as a positive electrode and a negative electrode, respectively. In the embodiment shown, the electrode assembly 110 is positioned so as to have a vertical winding axis (or central axis) C within the case 140. Herein, the top of the vertical winding axis C is defined as the top of the electrode assembly 110.

The first electrode plate 111 includes a first electrode collector 111a and first electrode active material layers 111b coated on both surfaces of the first electrode collector 111a. The first electrode collector 111a has a first electrode non-coating portion 111c that is not coated with a first electrode active material.

The first electrode collector 111a, in one embodiment, is in the form of a foil for collecting electric current and, in one embodiment, is made of aluminum, or alternatively, may be made from any other suitable material. The first electrode active material layers 111b serve to generate electricity and, in one embodiment, are formed of a transition metal oxide, such as $LiCoO_2$, $LiNiO_2$, or $LiMn_2O_4$, or any other suitable material. The first electrode non-coating portion 111c is formed on the upper surface of the first electrode collector 111a and acts as a path through which an electric current flows from the first electrode plate 111 to the outside.

The first electrode non-coating portion 111c, in one embodiment, is substantially rectangular, and includes a first horizontal portion 114 and a plurality of first protrusions 115. The first horizontal portion 114 and the first protrusions 115 may be formed by partially cutting the first electrode non-coating portion at predetermined intervals in the lengthwise direction. The first horizontal portion 114, in one embodiment, has the same length as the first electrode collector 111a. The first protrusions 115 protrude upward in a direction perpendicular to the first horizontal portion 114. As illustrated in FIG. 4, the first protrusions 115 are positioned at one side of the upper surface of the electrode assembly 110 with respect to the winding axis C while being exposed to the outside of the upper surface of the electrode assembly 110. The first protrusions 115, in one embodiment, are divided into a round, or curved, portion R and a planar, or straight, portion P, which are defined by the wound shape of the electrode assembly 110. The round portion R is positioned farther away from the winding axis C of the electrode assembly 110 than the planar portion P. Further, the first protrusions 115, in one embodiment, are denser in the round portion R than in the planar portion P when taking into consideration the wound shape of the electrode assembly 110. In one embodiment, as shown in FIG. 4, the ends of the first protrusions 115 facing the winding axis C of the electrode assembly 110 are arranged in a straight line. That is, the planar portion P has a planar edge that is substantially perpendicular to the length direction at a side proximate the winding axis C. In this embodiment, the first protrusions 115 are formed in such a manner that the width of the first protrusions 115 increases in proportion to the number of turns of the first electrode plate 111.

The second electrode plate 112 includes a second electrode collector 112a and second electrode active material layers 112b coated on both surfaces of the second electrode collector 112a. The second electrode collector 112a has a second electrode non-coating portion 112c that is not coated with a second electrode active material.

The second electrode collector 112a, in one embodiment, is in the form of a foil for collecting electric current and, in one embodiment, is made of nickel or copper, or alternatively, may be made from any other suitable material. The second electrode active material layers 112b are configured to generate electricity and, in one embodiment, are formed of graphite, carbon, or the like, though alternatively, may be formed from any other suitable material. The second electrode non-coating portion 112c is formed on the upper surface of the second electrode collector 112a and acts as a path through which an electric current flows from the second electrode plate 112 to the outside.

The second electrode non-coating portion 112c, in one embodiment, is substantially rectangular, and includes a second horizontal portion 116 and a plurality of second protrusions 117. The second horizontal portion 116 and the second protrusions 117 may be formed by partially cutting the second electrode non-coating portion at predetermined intervals in the lengthwise direction. The second horizontal portion 116, in one embodiment, has the same length as the second electrode collector 112a. The second protrusions 117 protrude upward in a direction perpendicular to the second horizontal portion 116. As illustrated in FIG. 4, the second protrusions 117 are positioned at the other side (i.e. a side opposite the first protrusions 115) of the upper surface of the electrode assembly 110 with respect to the winding axis C while being exposed to the outside of the upper surface of the electrode assembly 110. The second protrusions 117 may be divided into a round, or curved, portion R and a planar, or straight, portion P, which are defined by the wound shape of the electrode assembly 110. The round portion R is positioned farther away from the winding axis C of the electrode assembly 110 than the planar portion P. The second protrusions 117, in one embodiment, are denser in the round portion R than in the planar portion P when taking into consideration the wound shape of the electrode assembly 110. In one embodiment, the ends of the second protrusions 117 facing the winding axis C of the electrode assembly 110 are arranged in a straight line. That is, the planar portion P has a planar edge that is substantially perpendicular to the length direction at a side proximate the winding axis C. In this embodiment, the second protrusions 117 are formed in such a manner that the width of the second protrusions 117 increases in proportion to the number of turns of the second electrode plate 112.

The first electrode plate 111 and the second electrode plate 112 may be arranged with different polarities.

The separator 113 is interposed between the first electrode plate 111 and the second electrode plate 112 to prevent a short circuit between the first and second electrode plates 111 and 112. The separator 113 also serves to allow migration of lithium ions therethrough and may be made of a film of polyethylene, polypropylene, or any other suitable material or a composite thereof.

The first electrode plate 111, the second electrode plate 112 and the separator 113, in one embodiment, may be an aluminum (Al) foil, a copper (Cu) foil and a polyethylene (PE) or polypropylene (PP) film, respectively, but are not limited to these materials.

The first electrode plate 111, the separator 113, and the second electrode plate 112 are arranged in such a manner that the first protrusions 115 of the first electrode non-coating portion 111c and the second protrusions 117 of the second electrode non-coating portion 112c are exposed to the outside of the two sides of the upper surface of the electrode assembly 110, respectively, as illustrated in FIGS. 3 and 4. Then, in one embodiment, the first electrode plate 111 and the second electrode plate 112 are wound together with the separator 113 in the form of a spiral to construct the electrode assembly 110. In addition to, or as an alternative to, this spiral winding, the first electrode plate 111, the separator 113, and the second electrode plate 112 may be laminated and wound in various forms.

The first collector plate 120 and the second collector plate 130 are coupled to both sides of the upper surface of the electrode assembly 110 and are electrically connected to the first electrode plate 111 and the second electrode plate 112, respectively. That is, in one embodiment, the first collector plate 120 is coupled to a first side of the upper surface of the electrode assembly 110, and the second collector plate 130 is coupled to a second side of the upper surface of the electrode assembly 110 that is opposite the first side.

The first collector plate 120 is made of an electrically conductive material. The first collector plate 120 is in contact with the first protrusions 115 of the first electrode non-coating portion 111c protruding from one side of the upper surface of the electrode assembly 110 and is electrically connected to the first electrode plate 111. The first collector plate 120, in one embodiment, is joined to the first protrusions 115 of the first electrode non-coating portion 111c by laser welding.

The second collector plate 130 is made of an electrically conductive material. The second collector plate 130 is in contact with the second protrusions 117 of the second electrode non-coating portion 112c protruding from the other side of the upper surface of the electrode assembly 110 and is electrically connected to the second electrode plate 112. The second collector plate 130, in one embodiment, is joined to the second protrusions 117 of the second electrode non-coating portion 112c by laser welding.

The first collector plate 120 and the second collector plate 130 are coupled to the upper portion of the electrode assembly 110, so that the length of current paths between the electrode assembly 110 and electrode terminals positioned on the electrode assembly 110 can be shortened, leading to a reduction in internal resistance. Generally, the internal resistance increases with increasing length of current paths. Further, the first collector plate 120 and the second collector plate 130, in one embodiment, are directly coupled to the electrode assembly 110 without the use of any connection tabs, thereby saving space in the case 140 otherwise used for connection tabs. In embodiments of the present invention, the number of turns of the electrode assembly 110 may be increased as a result of the saved space in the case 140. The first collector plate 120 and the second collector plate 130 are joined to the upper surface of the electrode assembly 110 by laser welding, in one embodiment, so that gas released from the electrode assembly 110 can flow smoothly from the electrode assembly 110 to a safety vent positioned above the electrode assembly 110 while providing a sufficient region through which the gas may flow.

The first and second collector plates 120 and 130 correspond to each other in terms of their structures. Thus, an explanation of the structure of the first collector plate 120 will be given in detail below, while an explanation of the structure of the second collector plate 130 is omitted.

Referring to FIGS. 4 through 6, the first collector plate 120 has a round, or curved, region Sw covering the round portion R of the first protrusions 115. The first collector plate 120 may further have a planar, or straight, region Sc covering the planar portion P of the first protrusions 115.

Specifically, in one embodiment, the first collector plate 120 has a base portion 121, a flange portion 122, a terminal hole 123, and a recessed portion 124.

The base portion 121 faces the first protrusions 115 of the electrode assembly 110 and is made of a planar plate having a planer shape that is substantially the same as that of the first protrusions 115. That is, the base portion 121, in one embodiment, has a substantially semi-elliptical, semi-circular, or otherwise curved, shape in the round region Sw and a substantially rectangular, or otherwise straight, shape in the planar region Sc.

The flange portion 122 extends from the distal end of the base portion 121 toward the first protrusions 115 of the electrode assembly 110. The flange portion 122 may be open at a side thereof proximate to the winding axis C of the electrode assembly 110 to allow smooth coupling between the first collector plate 120 and the first protrusions 115.

The terminal hole 123, in one embodiment, is formed in the planar region Sc of the base portion 121. A portion of a first electrode terminal 152, which will be described later, is fitted into and coupled to the terminal hole 123.

The recessed portion 124, in one embodiment, is formed in the round region Sw of the base portion 121 and provides a space where welding is performed to join the first collector plate 120 to the first protrusions 115. The recessed portion 124 protrudes from the base portion 121 toward the electrode assembly 110. The recessed portion 124, in one embodiment, presses and bends the first protrusions 115 of the first electrode non-coating portion 111c when the electrode assembly 110 is coupled to the first collector plate 120. As such, a lower surface of the recessed portion 124 in contact with the first protrusions 115 increases a contact area between the first electrode plate 120 and the first protrusions 115 to facilitate attachment (e.g., by laser welding) of the first collector plate 120 to the first protrusions 115.

The structure of the second collector plate 130 corresponds to that of the first collector plate 120. The second collector plate 130 has a round, or curved, region Sw covering the round portion R of the second protrusions 117 and a planar, or straight, region Sc covering the planar portion P of the second protrusions 117. Specifically, the second collector plate 130, in one embodiment, has a base portion 131, a flange portion 132, a terminal hole 133, and a recessed portion 134. The structure of the second collector plate 130 corresponds to that of the first collector plate 120, as mentioned above, and thus a detailed description thereof is omitted.

The case 140, in one embodiment, is made of an electrically conductive metal, such as aluminum, an aluminum alloy, or nickel-plated steel. The case 140 is substantially hexahedral in shape and has an opening through which the electrode assembly 110 having the vertical winding axis C can be inserted and contained therein. Although only a coupled state between the case 140 and the cap assembly 150 is illustrated and the opening of the case 140 is not illustrated in FIG. 1, it is understood that a circumferential portion 140a of the cap assembly 150 indicates the opening of the case 140 when it is substantially open. The inner surface the case 140, in one embodiment, is treated to insulate the case 140 from the electrode assembly 110 and/or the cap assembly 150.

The cap assembly 150, as shown in FIGS. 1 and 2, is coupled to the case 140. The cap assembly 150, in one embodiment, includes a cap plate 151, a first electrode terminal 152, a second electrode terminal 153, gaskets 154, and nuts 155.

The cap plate 151 seals the case 140 and may be made of the same material as the case 140.

The first electrode terminal 152 and the second electrode terminal 153, in one embodiment, are insulated from the cap plate 151. The first electrode terminal 152 and the second electrode terminal 153 penetrate the cap plate 151 and are electrically connected to the first collector plate 120 and the second collector plate 130, respectively.

One of the gaskets 154 is interposed between the first electrode terminal 152 and the cap plate 151 to insulate the first electrode terminal 152 from the cap plate 151, and the other gasket 154 is interposed between the second electrode terminal 153 and the cap plate 151 to insulate the second electrode terminal 153 from the cap plate 151. Each of the two gaskets 154 may have a coupling groove 154a to physically fasten the gasket to the corresponding electrode terminal 152 or 153.

With reference to FIG. 1, each of the nuts 155, in one embodiment, is fastened along a threaded portion S formed in the corresponding electrode terminal 152 or 153 to fix the electrode terminal 152 or 153 to the cap plate 151.

The cap assembly 150 may include a stopper 156 to close an electrolyte injection hole (not shown) penetrating the cap plate 151, and/or a safety vent 157 formed on a lower surface of the cap plate 151. An electrolyte may be injected into the case 140 through the electrolyte injection hole (not shown). The safety vent 157, in one embodiment, has a small thickness and is configured to rupture to release internal gas to the outside when a gas pressure inside the case 140 exceeds a reference value.

The first and second electrode terminals 152 and 153 of the cap assembly 150, in one embodiment, correspond to each other in terms of their structures. Thus, an explanation of the structure of the first electrode terminal 152 will be given in detail below, while an explanation of the structure of the second electrode terminal 153 is omitted.

The first electrode terminal 152, in one embodiment, has a first head portion 152a, a first plate portion 152b, a first coupling protrusion 152c, and a first fixing portion 152d.

The first head portion 152a penetrates and extends upward from the cap plate 151. The first head portion 152a is fastened to the corresponding nut 155 in the threaded portion S formed on the outer surface thereof.

The first plate portion 152b is connected at right angles to the first head portion 152a and is positioned under the cap plate 151.

The first coupling protrusion 152c protrudes from one side of the first plate portion 152b. The first coupling protrusion 152c, in one embodiment, is coupled to the coupling groove 154a of the corresponding gasket 154 to prevent the first electrode terminal 152 from rotating during the fabrication of the rechargeable battery 100.

An extension 52d (see FIG. 4) extending from the lower surface of the first plate portion 152b penetrates the terminal hole 123 of the first collector plate 120 and is deformed by riveting to form the first fixing portion 152d. That is, the first fixing portion 152d formed under the first collector plate 120 has a larger area than the terminal hole 123 of the first collector plate 120. With these dimensions, the first fixing portion 152d serves to fix the first electrode terminal 152 to the first collector plate 120. Although not illustrated, the first fixing portion 152d may be provided in plurality under the first plate portion 152b to further improve the coupling between the first electrode terminal 152 and the first collector plate 120. In this case, it should be understood that the terminal hole 123 of the first collector plate 120 is also provided in plurality.

The second electrode terminal 153, in one embodiment, has a second head portion 153a, a second plate portion 153b, a second coupling protrusion 153c, and a second fixing portion 153d. The structure of the second electrode terminal 153, in one embodiment, corresponds to that of the first electrode terminal 152, as mentioned above, and thus a detailed description thereof is omitted.

The rechargeable battery 100, in one embodiment, is fabricated by the following procedure. First, the electrode assembly 110 is inserted into the case 140 through the open upper portion of the case 140. Then, the cap assembly 150 is coupled to the case 140. After an electrolyte is injected into the case 140 through the electrolyte injection hole of the cap assembly 150, the electrolyte injection hole is closed by the stopper 156.

Figure 7:
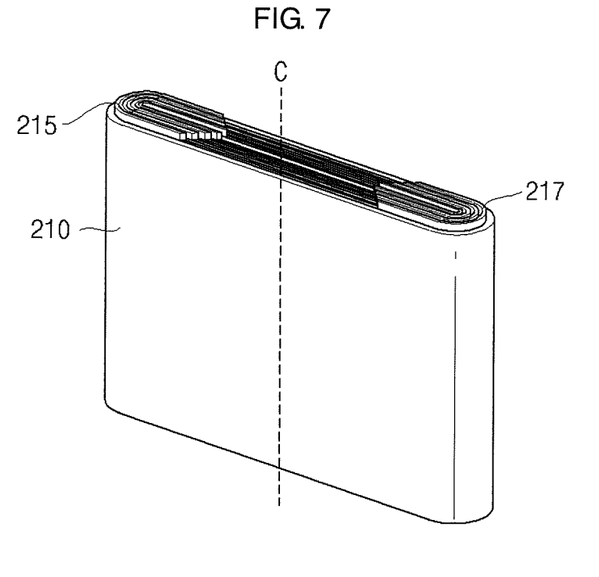
FIG. 7 is a perspective view illustrating an electrode assembly according to another embodiment of the present invention.
Figure 8:
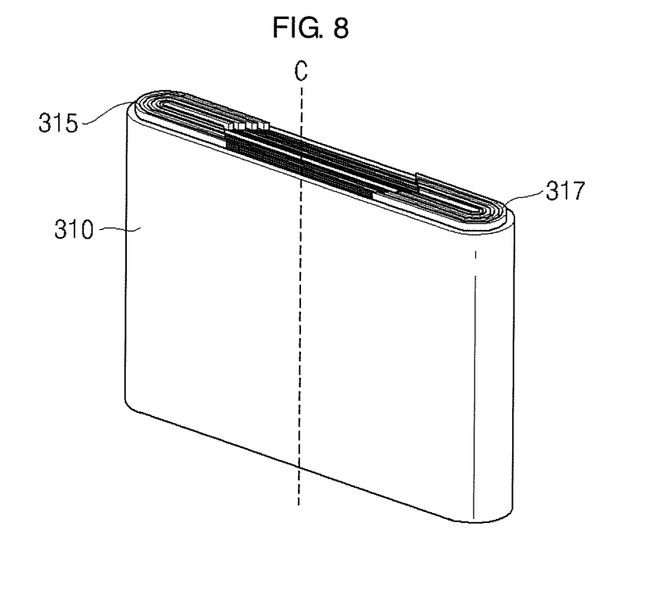
FIG. 8 is a perspective view illustrating an electrode assembly according to another embodiment of the present invention.

In one embodiment, as shown in FIG. 4, the distal ends of the first and second protrusions 115 and 117 of the electrode assembly 110 facing the winding axis C of the electrode assembly 110 are in a straight line. According to another embodiment, the distal ends of first and second protrusions 215 and 217 of an electrode assembly 210 facing a winding axis C of the electrode assembly 210 are arranged in a "V" configuration so as to protrude toward the winding axis C of the electrode assembly 210, as illustrated in FIG. 7. That is, the planar portion P has a planar edge that is angled toward a central region of the electrode assembly 210 in the length direction. According to another embodiment, the distal ends of first and second protrusions 315 and 317 of an electrode assembly 310 facing a winding axis C of the electrode assembly 310 are arranged in a "V" configuration so as to be indented in the lateral directions from the winding axis C of the electrode assembly 310, as illustrated in FIG. 8. Here, the "V" shape points away from the winding axis C. That is, the planar portion P has a planar edge that is angled toward a central region of the electrode assembly 310 in the length direction.

Hereinafter, a construction of the electrode assembly 310 illustrated in FIG. 8 will be described. The electrode assemblies 110 and 210 illustrated in FIGS. 4 and 7, respectively, are also constructed according to the following description in an exemplary embodiment.

Figure 9:
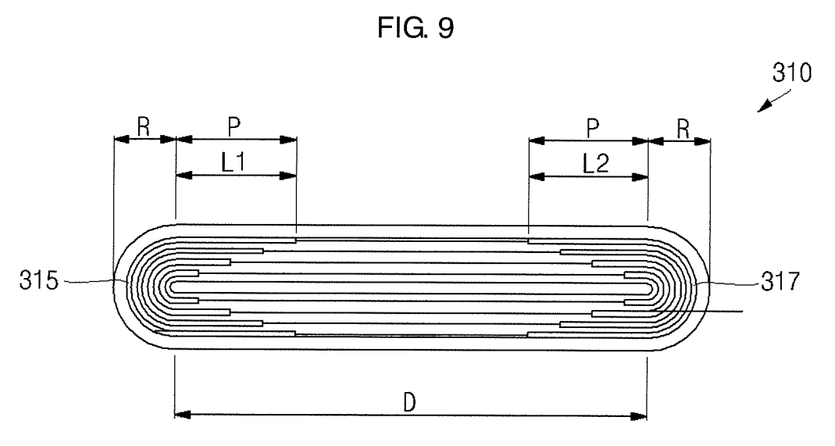
FIG. 9 is a plan view illustrating the electrode assembly of FIG. 8.

Referring to FIG. 9, in an exemplary embodiment, the construction of the electrode assembly 310 meets the following condition: $0<L1, L2<D/2$ and $0<L1+L2<D$, where L1 and L2 represent the lengths of the planar portions P of the first and second protrusions 315 and 317, respectively, and D represents the entire length of the planar portion of the electrode assembly 310. A reason why L1 and L2 are set to be smaller than D/2 is to prevent or substantially prevent the first protrusions 315 and the second protrusions 317 from overlapping each other on the upper surface of the electrode assembly 310. If the L1 and L2 were set to be greater than D/2, electrical short circuits between the first protrusions 315 and the second protrusions 317 may be caused. A reason why the sum of L1 and L2 is set to be smaller than D is to ensure the round portions R of the first and second protrusions 315 and 317 while preventing or substantially preventing the first and second protrusions 315 and 317 from overlapping each other.

In the illustrated embodiment, the first collector plate 120 and the second collector plate 130 are coupled to the respective sides of the upper surface of the electrode assembly 110 having the vertical winding axis C and are coupled to the first electrode terminal 152 and the second electrode terminal 153 positioned on the electrode assembly 110, respectively. The rechargeable battery 100, due to the above-described construction, has a shorter current path between the electrode assembly and each of the respective electrode terminals than a typical rechargeable battery in which collector plates are coupled to the upper and lower surfaces of an electrode assembly having a vertical winding axis and a rechargeable battery in which collector plates are coupled to both sides of an electrode assembly having a horizontal winding axis. The shortened current paths of embodiments of the rechargeable battery of the present invention reduce an internal resistance, and as a result, the rechargeable battery 100 is configured to have an increased output.

Further, in exemplary embodiments of the present invention, the first and second collector plates 120 and 130 are directly coupled to the electrode assembly 110 without the use of any connection tabs, thereby saving space typically used for connection tabs in a case. Therefore, the electrode assembly 110, in exemplary embodiments, has a greater number of turns due to the saved space, which corresponds to an increase in the capacity of the rechargeable battery 100.

In the fabrication of a conventional rechargeable battery, ultrasonic welding may be performed under pressure to join collector plates to respective positive and negative electrode non-coating portions proximate to one another, causing a reduction of the region through which gas generated from an electrode assembly may be released to the outside. In another conventional rechargeable battery, in which collector plates are coupled to respective positive and negative electrode non-coating portions exposed at both sides of an electrode assembly having a horizontal winding axis, gas released from the electrode assembly collides with both sides of a case, which makes it difficult for the gas to reach a safety vent positioned above the electrode assembly. In contrast, in the fabrication of the rechargeable battery 100, according to one embodiment, laser welding is performed to join the first and second collector plates 120 and 130 to the first and second electrode non-coating portions 111c and 112c of the electrode assembly 110 having the vertical winding axis C, respectively, thus avoiding the above-described problems of conventional rechargeable batteries. Therefore, improved safety of the rechargeable battery 100 is achieved.

Next, an explanation will be given of a rechargeable battery according to another embodiment of the present invention.

The rechargeable battery according to another embodiment has substantially the same construction and function as the rechargeable battery 100 described above except for the structure of recessed portions of first and second collector plates. In the following description, repeated explanation of components or portions thereof having a construction the same as those described above is omitted. Also, as discussed in the earlier-described embodiment, the structure of the second collector plate, in one embodiment, corresponds to that of the first collector plate, and thus a description thereof is also omitted.

Figure 10:
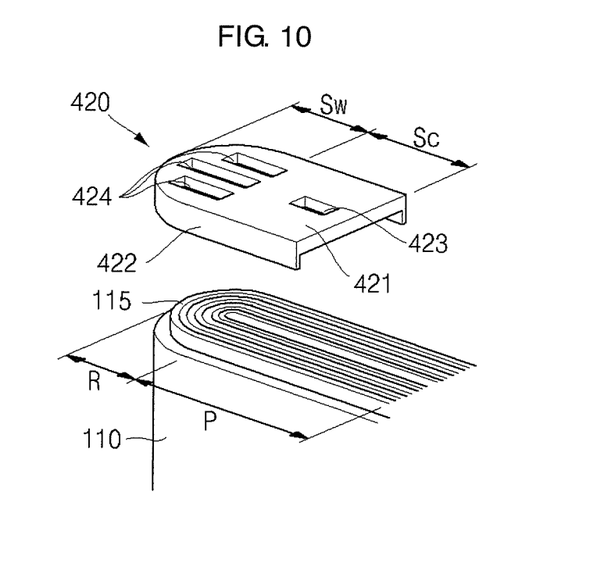
FIG. 10 is a perspective view, which corresponds to region 'A' of FIG. 4, illustrating a first collector plate according to another embodiment of the present invention.
Figure 11:
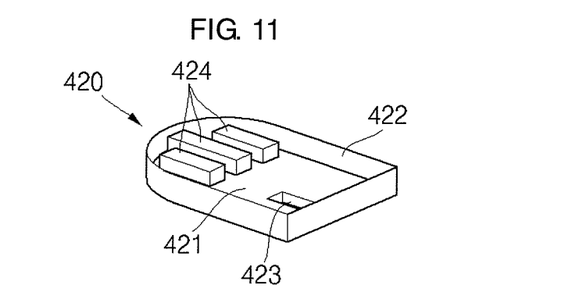
FIG. 11 is a perspective view illustrating the first collector plate of FIG. 10 in which a lower surface is shown facing upward.

FIG. 10 is a perspective view, which corresponds to region 'A' of FIG. 4, illustrating a first collector plate according to another embodiment of the present invention, and FIG. 11 is a perspective view illustrating the first collector plate of FIG. 10 in which a lower surface is shown facing upward.

Referring to FIGS. 10 and 11, a first collector plate 420 has a round, or curved, region Sw covering the round portion R of the first protrusions 115. The first collector plate 420, in one embodiment, further has a planar, or straight, region Sc covering the planar portion P of the first protrusions 115.

Specifically, the first collector plate 420, in one embodiment, has a base portion 421, a flange portion 422, a terminal hole 423, and a plurality of recessed portions 424.

The shapes and the functions of the base portion 421, the flange portion 422, and the terminal hole 423 may be the same as those of the base portion 121, the flange portion 122, and the terminal hole 123 of the first collector plate 120 illustrated in FIG. 6.

The recessed portions 424 are functionally the same as the recessed portion 124 of the first collector plate 120, except that the recessed portions 424 are arranged in plural and parallel or substantially parallel to the lengthwise direction of the first collector plate 420 in the round region Sw, unlike the recessed portion 124. The recessed portions 424 cross the protrusions 115 positioned in the round region Sw on the same plane.

In one embodiment, as shown in FIG. 10, the plurality of recessed portions 424 are arranged parallel to the lengthwise direction of the first collector plate 420 in the round region Sw. This arrangement allows laser welding lines to be formed by laser welding on the recessed portions 424 and to cross the protrusions 115 on the same plane, achieving improved coupling of the first collector plate 420 to the protrusions 115.

Next, an explanation will be given of a rechargeable battery according to another embodiment of the present invention.

The rechargeable battery, according to another embodiment, has substantially the same construction and functions as the rechargeable battery 100 described above except for the structure of recessed portions of first and second collector plates. In the following description, repeated explanation of components or portions thereof having the same construction as those described above is omitted. Also, in one embodiment, the structure of the second collector plate corresponds to that of the first collector plate 520, and thus a description thereof is also omitted.

Figure 12:
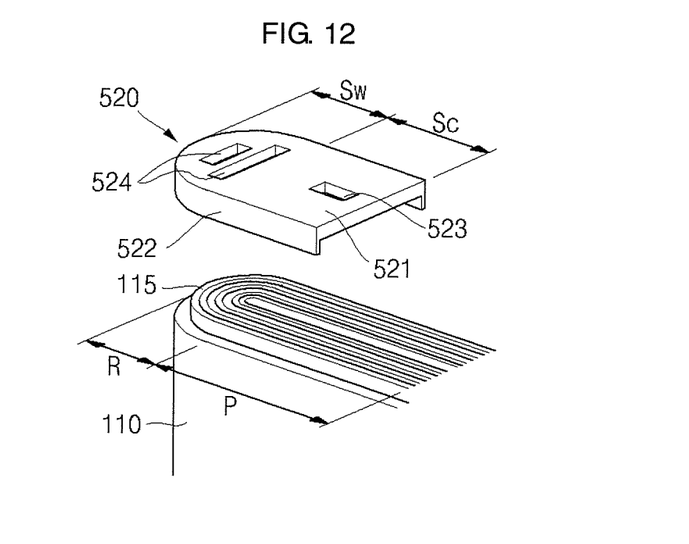
FIG. 12 is a perspective view, which corresponds to region 'A' of FIG. 4, illustrating a first collector plate according to another embodiment of the present invention.
Figure 13:
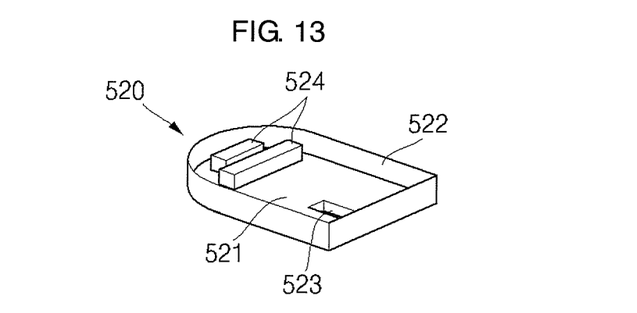
FIG. 13 is a perspective view illustrating the first collector plate of FIG. 12 in which a lower surface is shown facing upward.

FIG. 12 is a perspective view, which corresponds to region 'A' of FIG. 4, illustrating a first collector plate according to another embodiment of the present invention, and FIG. 13 is a perspective view illustrating the first collector plate of FIG. 12 in which a lower surface is shown facing upward.

Referring to FIGS. 12 and 13, a first collector plate 520 has a round, or curved, region Sw covering the round portion R of the first protrusions 115. The first collector plate 520, in one embodiment, further has a planar, or straight, region Sc covering the planar portion P of the first protrusions 115.

In one embodiment, the first collector plate 520 has a base portion 521, a flange portion 522, a terminal hole 523, and a plurality of recessed portions 524.

The shapes and the functions of the base portion 521, the flange portion 522, and the terminal hole 523 are substantially the same as those of the base portion 121, the flange portion 122, and the terminal hole 123 of the first collector plate 120 described above and illustrated in FIG. 6.

The recessed portions 524 are functionally the same as the recessed portion 124 of the first collector plate 120, except that the recessed portions 524 are arranged in plural and perpendicular or substantially perpendicular to the lengthwise direction of the first collector plate 520 in the round region Sw, unlike the recessed portion 124 of the first collector plate 120. The recessed portions 524 specify the locations to be irradiated with a laser upon laser welding so that the laser welding can be performed in more exact locations of the recessed portions 524.

In one embodiment, as shown in FIG. 12, the plurality of recessed portions 524 are arranged perpendicular to the lengthwise direction of the first collector plate 520 in the round region Sw. This arrangement allows the laser welding to be performed on more exact locations of the recessed portions 524, achieving improved welding efficiency.

Next, an explanation will be given of a rechargeable battery according to another embodiment of the present invention.

The rechargeable battery, according to another embodiment, has the substantially the same construction and functions as the rechargeable battery 100 described above, except that slits are further formed in first and second collector plates. In the following description, repeated explanation of components or portions thereof having the same construction as those described above is omitted. Also, in one embodiment, the structure of the second collector plate corresponds to that of the first collector plate, and thus a description thereof is also omitted.

Figure 14:
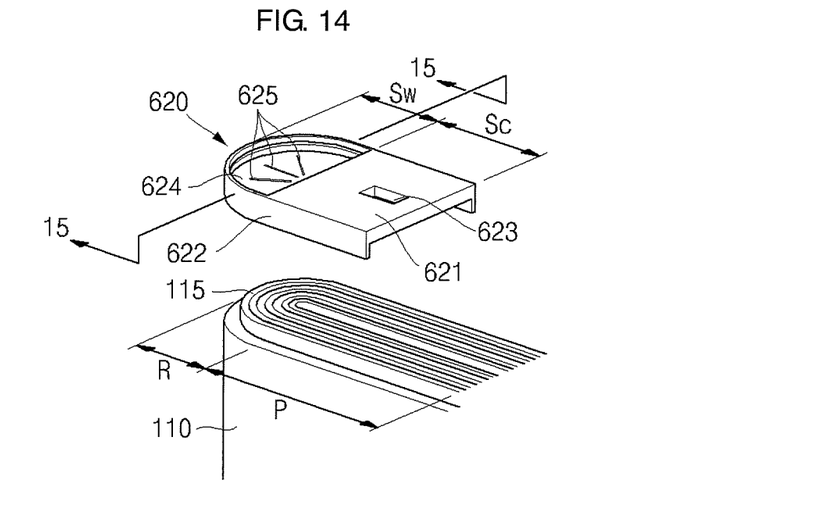
FIG. 14 is a perspective view, which corresponds to region 'A' of FIG. 4, illustrating a first collector plate according to another embodiment of the present invention.
Figure 15:
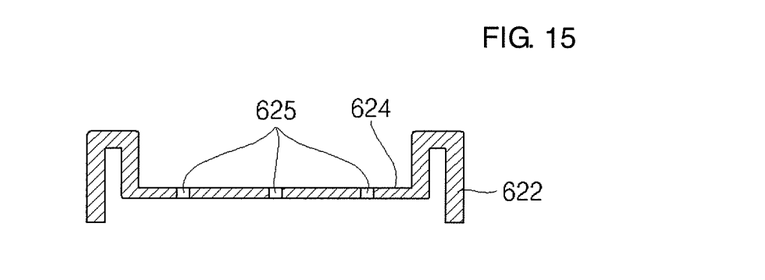
FIG. 15 is a cross-sectional view of the first collector plate of FIG. 14 taken along line 15-15 of FIG. 14.

FIG. 14 is a perspective view, which corresponds to region 'A' of FIG. 4, illustrating a first collector plate according to another embodiment of the present invention, and FIG. 15 is a cross-sectional view of the first collector plate of FIG. 14 taken along line 15-15 of FIG. 14.

Referring to FIGS. 14 and 15, a first collector plate 620 has a round, or curved, region Sw covering the round portion R of the first protrusions 115. The first collector plate 620, in one embodiment, further has a planar, or straight, region Sc covering the planar portion P of the first protrusions 115.

In one embodiment, the first collector plate 620 has a base portion 621, a flange portion 622, a terminal hole 623, a recessed portion 624, and slits 625.

The shapes and the functions of the base portion 621, the flange portion 622, the terminal hole 623, and the recessed portion 624 are substantially the same as those of the base portion 121, the flange portion 122, the terminal hole 123, and the recessed portion 124 of the first collector plate 120 described above and illustrated in FIG. 6.

The slits 625 are formed so as to penetrate the region of the recessed portion 624. The slits 625 allow a worker to observe and check the dense state of the first protrusions 115 and the laser welding states of the recessed portion 624 and the first protrusions 115 from the outside of the electrode assembly 110. Further, each of the slits 625 blocks or reduces laser heat which is generated, in one embodiment, during laser welding of the recessed portion 624 to the first protrusions 115 from transferring from one side thereof to the other side, so that the laser heat can be focused on the welding of the recessed portion 624 to the first protrusions 115. As a result, the slits 625 can increase the efficiency of the laser welding of the recessed portion 624 to the first protrusions 115.

In the embodiment shown in FIGS. 14 and 15, the slits 625 formed in the recessed portion 624 of the first collector plate 620 allow a worker to check the dense state of the first protrusions 115 and the laser welding state of the recessed portion 624 and the first protrusions 115. Therefore, the slits 625 enable the worker to cope with defects in the dense state and the welding states.

Further, in one embodiment, when the recessed portion 624 is joined to the first protrusions 115 by laser welding, the slits 625 allow the laser heat to be focused on the welding of the recessed portion 624 to the first protrusions 115. Therefore, the slits 625 increase the efficiency of the laser welding of the recessed portion 624 to the first protrusions 115, making the coupling of the first collector plate 620 to the electrode assembly 110 more reliable.

Although some exemplary embodiments of the present invention have been shown and described herein, it would be appreciated by those skilled in the art that changes may be made from these embodiments without departing from the principles and spirit of the invention, the scope of which is defined in the claims and their equivalents.

What is claimed is:

1. A rechargeable battery comprising:
   an electrode assembly comprising a first electrode plate comprising a plurality of first protrusions extending in a first direction from a first end of the first electrode plate at a first side of an end of the electrode assembly, and a second electrode plate comprising a plurality of second protrusions extending in the first direction from a first end of the second electrode plate at a second side of the end of the electrode assembly opposite the first side, at least one of the plurality of first protrusions or the plurality of second protrusions including a planar portion and a curved portion, the planar portion extending in a length direction from the curved portion toward the other of the plurality of first protrusions or the plurality of second protrusions;
   a case containing the electrode assembly;
   a collector plate coupled to protrusions of the at least one of the plurality of first protrusions or the plurality of second protrusions, the collector plate comprising a recessed portion including a surface facing the electrode assembly in a second direction opposite the first direction and being welded to the curved portion, the surface pressing and bending the protrusions to increase a contact area between the surface and the protrusions; and
   an electrode terminal coupled to the collector plate at a region of the collector plate covering the planar portion.

2. The rechargeable battery of claim 1, wherein the curved portion is at a side of the electrode assembly distal from a central axis of the electrode assembly.

3. The rechargeable battery of claim 2, wherein the planar portion has a planar edge that is substantially perpendicular to the length direction at a side proximate the central axis.

4. The rechargeable battery of claim 2, wherein the planar portion has a planar edge that is angled toward a central region of the electrode assembly in the length direction.

5. The rechargeable battery of claim 2, wherein the collector plate comprises a planar region at a location corresponding to the planar portion of the electrode assembly, and a curved region welded to the curved portion of the electrode assembly.

6. The rechargeable battery of claim 2, wherein the collector plate is a first collector plate coupled to the plurality of first protrusions at the first side of the end of the electrode assembly, and the rechargeable battery further comprises a second collector plate coupled to the plurality of second protrusions at the second side of the end of the electrode assembly opposite the first side.

7. The rechargeable battery of claim 1, wherein the collector plate farther comprises a base portion including the recessed portion, and a flange portion surrounding the base portion.

8. The rechargeable battery of claim 1, wherein the recessed portion of the collector plate comprises a plurality of recessed portions extending in the length direction and welded to the electrode assembly.

9. The rechargeable battery of claim 1, wherein the recessed portion of the collector plate comprises a plurality of recessed portions extending in a direction substantially perpendicular to the length direction and welded to the electrode assembly.

10. The rechargeable battery of claim 1, wherein the collector plate has at least one opening formed through the recessed portion.

11. The rechargeable battery of claim 10, wherein the at least one opening includes a plurality of slits.

12. The rechargeable battery of claim 1, wherein the end of the electrode assembly is not coated with an electrode active material.

13. The rechargeable battery of claim 1, further comprising a cap assembly comprising a cap plate sealing an opening of the case and a safety vent configured to release gas from the rechargeable battery.

14. The rechargeable battery of claim 1, wherein the collector plate is laser welded to the protrusions of the at least one of the plurality of first protrusions or the plurality of second protrusions.

* * * * *